(12) United States Patent  
Schult et al.

(10) Patent No.: US 9,077,277 B2
(45) Date of Patent: Jul. 7, 2015

(54) CONTROLLING AN ELECTRICAL CONSUMER OF AN AIRCRAFT

(71) Applicant: AIRBUS OPERATIONS GMBH, Hamburg (DE)

(72) Inventors: Jens Schult, Stelle (DE); Henning Everth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 205 days.

(21) Appl. No.: 13/685,992

(22) Filed: Nov. 27, 2012

(65) Prior Publication Data

US 2013/0134916 A1 May 30, 2013

Related U.S. Application Data

(60) Provisional application No. 61/564,052, filed on Nov. 28, 2011.

(30) Foreign Application Priority Data

Nov. 28, 2011 (DE) .................. 10 2011 119 644

(51) Int. Cl.
 *H02P 29/00* (2006.01)
 *H02P 21/05* (2006.01)
 *H02P 23/04* (2006.01)
(52) U.S. Cl.
 CPC .............. *H02P 21/05* (2013.01); *H02P 23/04* (2013.01)
(58) Field of Classification Search
 CPC .................................................... H02P 29/0038
 USPC .............. 318/400.23, 448, 606, 611, 629
 See application file for complete search history.

(56) References Cited

U.S. PATENT DOCUMENTS

| 3,764,872 | A | * | 10/1973 | Boice | 318/798 |
| 4,227,138 | A | * | 10/1980 | Espelage et al. | 318/802 |
| 6,144,176 | A | * | 11/2000 | Quinlan | 318/460 |
| 7,173,399 | B2 | | 2/2007 | Sihler et al. | |
| 7,468,561 | B2 | | 12/2008 | Kern et al. | |
| 7,565,903 | B2 | * | 7/2009 | Sasaki et al. | 126/24 |
| 7,768,220 | B2 | * | 8/2010 | Schulz et al. | 318/432 |

(Continued)

FOREIGN PATENT DOCUMENTS

DE 102008025960 A1 12/2009

OTHER PUBLICATIONS

German Patent Office, German Office Action dated Dec. 19, 2012 for German Patent Application No. 102011121707.3.

(Continued)

*Primary Examiner* — Bentsu Ro
(74) *Attorney, Agent, or Firm* — Ingrassia Fisher & Lorenz, P.C.

(57) ABSTRACT

An electrical consumer of an aircraft comprises an electric motor and an inverter for producing an alternating voltage for the electric motor. A method for controlling the electrical consumer comprises determining a rotational frequency for the electric motor. The method also includes establishing whether the rotational frequency leads to oscillations in the input current of the inverter which are below a predefined threshold, the oscillations being produced by the inverter when producing a supply voltage for the electric motor, and changing the rotational frequency if it has been established that the rotational frequency leads to oscillations below the predefined threshold.

10 Claims, 2 Drawing Sheets

(56) References Cited

U.S. PATENT DOCUMENTS 8,461,793 B2 * 6/2013 Ohshima .................. 318/503
2010/0231159 A1 9/2010 Obi et al.
2011/0111683 A1 5/2011 Kelnhofer

OTHER PUBLICATIONS

Mildice et al., "Variable-Speed Induction Motor Drives for Aircraft Environmental Control Compressors", NASA Technical Memorandum, 31st Intersociety Energy Conversion Engineering Conference, Aug. 11-16, 1996, Washington, D.C.

Schult, Jens, U.S. Appl. No. 13/718,836, filed Dec. 18, 2012, entitled Electrical System for an Aircraft.

De Rosa, F., et al., "On the Interharmonic Components Generated by Adjustable Speed Drives", IEEE Transactions on Power Delivery, vol. 20, No. 4, Oct. 2005.

German Patent Office, Office Action for German Application No. DE 10 2011 119 644.0, dated Aug. 28, 2012.

\* cited by examiner

CONTROLLING AN ELECTRICAL CONSUMER OF AN AIRCRAFT

CROSS-REFERENCE TO RELATED APPLICATIONS

This application claims priority to German Patent Application No. 10 2011 119 644.0, filed Nov. 28, 2011 and to U.S. Provisional Patent Application No. 61/564,052, filed Nov. 28, 2011, which are each incorporated herein by reference in their entirety.

TECHNICAL FIELD

The present disclosure relates to a method, a computer program and a computer-readable medium for controlling an electrical consumer of an aircraft, a control unit for an electrical consumer and an aircraft.

BACKGROUND

When operating electrical consumers in the electrical onboard network of an aircraft, there may be subharmonic/interharmonic and harmonic frequencies of the current or voltage. Depending on the frequency range of the subharmonic/interharmonic and harmonic frequencies, there may be resonance oscillations in the supply voltage and mechanical oscillations within the generator drive. Oscillations of this type are undesirable.

In one example, electrical consumers having an electric motor and an inverter connected thereto, according to the selected architecture, may cause subharmonic/interharmonic and harmonic frequencies or oscillations of varying strength of the current depending on the operating state of the motor (rotational speed, network frequency and type of electric motor).

One approach for reducing subharmonic and interharmonic oscillations is reducing the oscillations occurring from the inverter by means of complex inverter switching processes. These include operating the electric machine by means of complex, sensor-free processes by means of sinusoidal rotary fields. This requires considerable complexity in terms of control for producing and controlling said rotary fields and further leads to higher switching losses of the inverter and to a significantly increased development complexity.

Examples of electrical consumers of this type include fans for ventilation, such as those described in DE 10 2008 025 960 A1 and US 2011/0111683 A1.

In addition, other objects, desirable features and characteristics will become apparent from the subsequent summary and detailed description, and the appended claims, taken in conjunction with the accompanying drawings and this background.

SUMMARY

Accordingly, it may be desirable to provide an aircraft having low wear, low noise levels and low maintenance costs.

In one exemplary embodiment, the present disclosure provides a method for controlling an electrical consumer of an aircraft, such as an aeroplane or a helicopter.

According to an exemplary embodiment of the present disclosure, the electrical consumer comprises an electric motor and an inverter for producing an alternating voltage for the electric motor. The electrical consumer may also comprise a control unit by means of which the inverter may be operated, for example by pulse-width modulation (PWM).

According to an exemplary embodiment of the present disclosure, the method comprises: determining the (original) rotational frequency for the electric motor; establishing whether the determined rotational frequency leads to undesirable subharmonic and/or interharmonic oscillations in an input current or input voltage of the inverter, wherein the oscillations or the frequencies of the oscillations are below a predefined threshold, the oscillations being produced by the inverter when producing a supply voltage or a supply current (commutation) for the electric motor; changing the rotational frequency if it has been established that the (original and/or unchanged) rotational frequency leads to oscillations below the predefined threshold.

In other words, undesirable subharmonic and interharmonic oscillations which are produced by the inverter in the onboard network (which may provide the input current or input voltage) of the aircraft may be prevented in that rotational frequencies of the electric motor in which oscillations of this type occur are not permitted, and instead are replaced by a rotational frequency for which this is not the case. In this way, it is unnecessary to suppress subharmonic and interharmonic oscillations by a complicated operation of the inverter. The method may therefore be interpreted as a method for preventing and/or influencing the emitted subharmonic and interharmonic frequency spectrum in inverter-controlled drives.

In one example, in aircraft which comprise an onboard network having a frequency which is variable over time, it may be necessary to use electric drives (or consumers) which comprise a synchronous motor. For example, a generator may be coupled gearlessly to a turbine and then, for example, an onboard network frequency of between, for example, about 400 Hz and about 800 Hz may be produced due to the variable rotational speed of the turbine. Drives having a synchronous motor generally comprise an inverter which produces subharmonic and interharmonic oscillations during switching processes. In this case, due to the occurrence of a beat between the network frequency and the commutation processes of switches of the inverter, oscillations of the output voltage may occur up to the range of the frequency ranges which are undesirable for generator control. The emitted subharmonic and interharmonic oscillations may be dependent on the rotational speed of the motor, the number of pairs of poles, the network frequency and the PWM frequency at which the inverter is operated.

However, instead of the complicated suppressing of the subharmonic and interharmonic oscillations at certain rotational frequencies, in a simpler manner the produced frequency spectrum may be offset together with the rotational frequency. The architectures of the inverter and the electric motor may remain the same and the frequency ranges which are undesirable for use may be prevented by influencing the frequency spectrum.

In a simple manner, certain threshold values may be maintained for the subharmonic and interharmonic oscillations by maintaining established and less complex inverter architectures. The use of less efficient and heavy components may be avoided.

In a PWM-operated inverter, a change in the rotational frequency leads to a change in the PWM frequency, whereby the emitted frequency spectrum is influenced in such a way that the emitted subharmonic and interharmonic frequencies of the current are prevented within a frequency range (for example below about 100 Hz).

According to an exemplary embodiment of the present disclosure, the method comprises controlling the inverter in such a way that the electric motor runs at the rotational frequency. The motor voltage or the supply voltage for the motor (a generally three-phase alternating voltage) is produced in such a way that the motor is operated at the original, or if this has been changed, at the changed, rotational frequency. For example, the inverter is configured so as to convert the rectified input current (which, for example, comes from an onboard network of the aircraft) into the motor current or the motor voltage by means of pulse-width modulation.

According to an exemplary embodiment of the present disclosure, the method further comprises: determining a rotational frequency at which no (or almost no) oscillations occur below the threshold if it has been established that the rotational frequency leads to oscillations below the predefined threshold; and changing the rotational frequency to the determined rotational frequency. It is to be understood that a rotational frequency at which no oscillations occur may also be a rotational frequency at which only oscillations which are below a certain limit relative to the amplitude of the alternating current in the onboard network occur, that is to say, for example, may be less than about 3% or about 1% of the amplitude of the alternating current.

This rotational frequency may now be determined for example in the following ways: a predefined rotational frequency offset may be added to or subtracted from the rotational frequency, which offset ensures that the resulting (changed) rotational frequency is outside a range in which oscillations occur. A predefined rotational frequency may also be set as a new rotational frequency. The predefined rotational frequency may be selected from a table of rotational frequencies for example based on the original rotational frequency.

It is also possible to move the rotational frequency out of a rotational frequency range in which undesirable oscillations occur. According to an exemplary embodiment of the present disclosure, the method further comprises: determining a rotational frequency range in which the rotational frequency leads to oscillations below the threshold if it has been established that the rotational frequency leads to oscillations below the predefined threshold; changing the rotational frequency to an end of the rotational frequency range, for example at the upper limit thereof or the lower limit thereof.

The subharmonic oscillations which are produced by the control of the motor may be calculated or determined in accordance with the selected motor control.

According to an exemplary embodiment of the present disclosure, the establishing comprises determining the frequency of the oscillations in the input current of the inverter via a predefined functional correlation with the rotational frequency. In other words, the oscillations at one rotational frequency or the frequencies of the oscillations may be calculated for example by using a model. For example, the PWM frequency of the inverter may be calculated in real-time depending on the operating state of the motor, that is to say the rotational frequency thereof, and the subharmonic and interharmonic oscillations resulting therefrom.

According to an exemplary embodiment of the present disclosure, rotational frequencies which lead to oscillations in the input current of the inverter having certain frequencies are stored in a table. The establishing may comprise determining the frequency of the oscillations in the input current of the inverter based on the table. Based on the table, it may be thus established that the rotational frequency leads to undesirable oscillations. Also the regions which do not lead to any subharmonic oscillations may be coded in this table.

According to an exemplary embodiment of the present disclosure, the inverter is connectable to an onboard network of the aircraft, which network has a frequency which is variable over time. For example, the inverter may be an indirect inverter which comprises a rectifier and a converter connected to the rectifier.

According to an exemplary embodiment of the present disclosure, the predefined threshold for suppressing undesirable oscillations is below a network frequency of the onboard network, for example about 100 Hz. By means of a threshold of this type, above all, undesirable oscillations in the onboard network which may have an effect on the generator may be prevented.

According to an exemplary embodiment of the present disclosure, establishing whether the rotational frequency leads to oscillations in the input current of the inverter is carried out by a local control unit which is configured to control the inverter for producing the supply voltage for the electric motor. In other words, it is possible for an electrical consumer to independently prevent undesirable oscillations from being produced.

According to an exemplary embodiment of the present disclosure, establishing whether the rotational frequency leads to oscillations in the input current of the inverter is carried out by a superordinate control unit which is configured to control a plurality of electrical consumers. It is possible for a central control unit to suppress the production of undesirable oscillations in the onboard network. The control unit may also be configured to determine various rotational frequencies for various electric motors, and this may be the case for example for a control unit of an air-conditioning system of the aircraft. A plurality of tables having permissible rotational frequencies for a plurality of electrical consumers may be stored in this control unit.

According to an exemplary embodiment of the present disclosure, the electrical consumer comprises a conveying device, the desired rotational frequency being determined from a desired conveying quantity of the conveying device. The conveying devices may be for example a fan or a pump. If a superordinate control unit controls a plurality of conveying devices (for example a ventilation system) which are connected in parallel relative to the fluid to be conveyed, and the rotational frequency of an electric motor which operates one of the conveying devices has to be changed due to oscillations which are to be prevented, the rotational speed of the electric motor may be increased and the rotational speed of a second electric motor, which operates an additional conveying device, may be reduced in such a way that the overall conveying quantity remains the same.

According to an exemplary embodiment of the present disclosure, the electrical consumer comprises a ventilation device. In one example, in the case of cabin ventilation devices, a change in the rotational frequency of the electric motor is possible without great difficulty.

Additionally, one of various exemplary aspects of the present disclosure relate to a computer program which, when it is executed in a processor, instructs the processor to carry out the method as described above and below, and a computer-readable medium on which a computer program of this type is stored. A computer-readable medium may include for example a RAM, a ROM, an EPROM, a flash memory, a floppy disk, a CD, a DVD or a hard drive.

Another one of various exemplary aspects of the present disclosure relates to a control unit or a control system for an electrical consumer of an aircraft which is configured to carry out the method as described above and below. This control unit may comprise, for example, a processor which is configured to execute the above-mentioned computer program and a non-volatile memory as a computer-readable medium on which this program is stored.

The control unit may be a local or a superordinate control unit or a combination of these two control units, that is to say a control system for electrical consumers of an aircraft.

Another one of various exemplary aspects of the present disclosure relates to an aircraft which is configured to automatically carry out the method.

According to an exemplary embodiment of the present disclosure, the aircraft comprises a generator which is mechanically coupled to a drive of the aircraft for supplying electrical consumers of the aircraft with electrical energy, an electrical consumer having an electric motor, an inverter for producing an alternating voltage for the electric motor and a control unit which is configured to carry out the method as described above and below.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
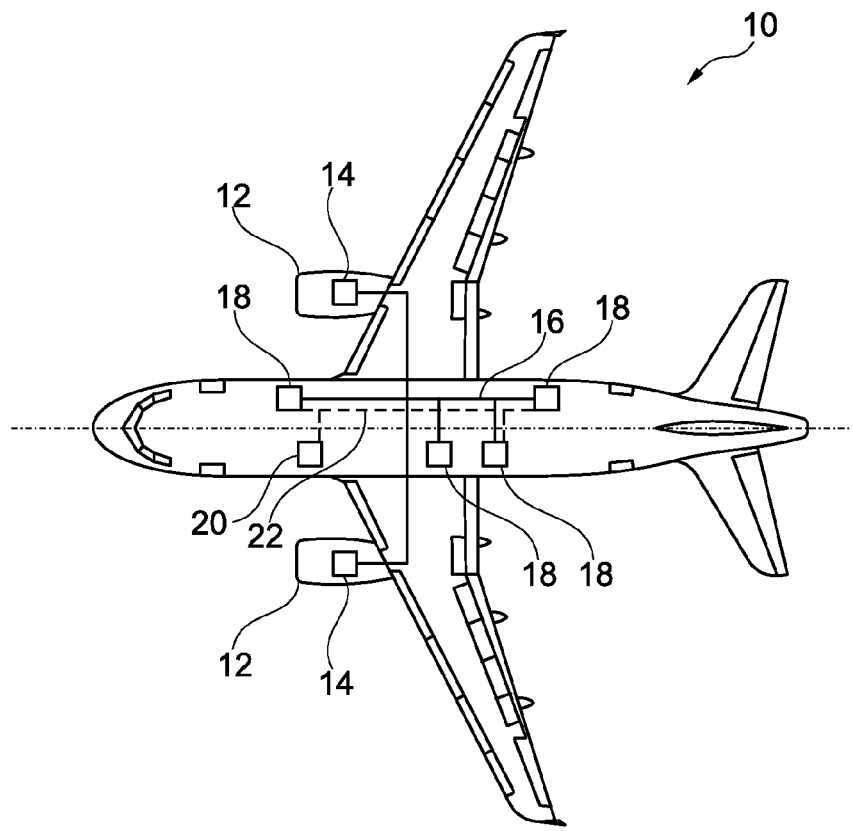
FIG. 1 is a schematic view of an aircraft according to an exemplary embodiment of the present disclosure.

FIG. 1 shows an aircraft 10 in the form of a passenger aircraft 10 which comprises two turbines 12 as a drive. Generators 14 are mechanically coupled to the turbines 12 and supply electric current to an onboard network 16 of the aircraft 10 during operation of the turbines 12. Depending on the operating state of the turbines, the generators 14 may produce a variable network frequency of between about 300 and about 800 Hz in the onboard network 16.

A plurality of electrical consumers 18 are connected to the onboard network 16. For example, the electrical consumers may be conveying devices 18 for air or liquids, which for example comprise fans or pumps. In one example, a ventilation system or an air-conditioning system of the aircraft 10 may comprise a plurality of ventilation devices 18 which serve to convey air from the surroundings into the interior of the aircraft 10, to convey air between internal spaces of the aircraft 10 and/or to circulate air.

The aircraft 10 may comprise a superordinate control unit 20, for example an air-conditioning system control device, which may control the individual electrical consumers 18 via control lines 22. For example, the control unit 20 may instruct an electrical consumer 18 to operate an electric motor at a certain rotational frequency.

Figure 2:
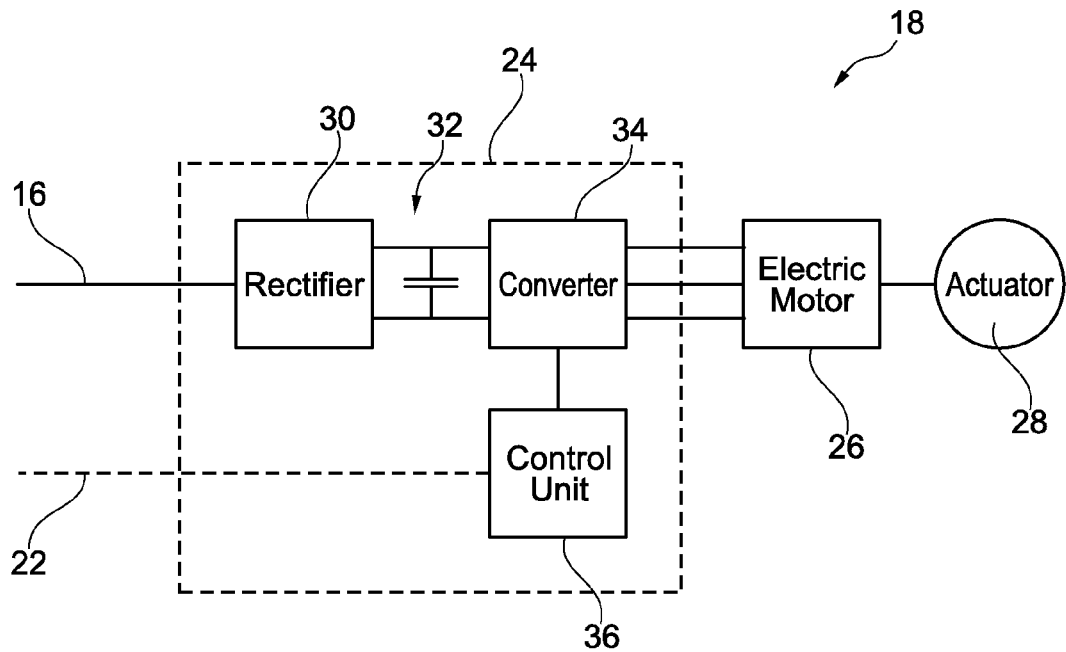
FIG. 2 is a schematic view of an electrical consumer according to an exemplary embodiment of the present disclosure.

FIG. 2 is a schematic view of a construction of an electrical consumer 18 which comprises an inverter 24 and an electric motor 26 connected thereto. The electric motor 26 is a synchronous motor of which the rotational frequency directly depends on the frequency of the output voltage of the inverter 24. An actuator 28, for example a fan or a pump, is connected to the motor 26.

Via the on-board network 16, the inverter 24 receives a variable alternating voltage which is rectified by means of a rectifier 30 and is fed into a direct current intermediate circuit 32. A converter 34 of the inverter 24 produces a generally three-phase alternating voltage from the direct current in the direct current intermediate circuit 32, in which said convertor pulse-width modulates the direct current. In addition, the inverter 24 comprises a control unit 36 which may receive a value for a desired rotational frequency via the control line 22 and which is configured to correspondingly switch the semiconductor of the converter 34 in such a way that a supply voltage for the electric motor 26 is produced, by means of which the electric motor 26 runs at the desired rotational frequency.

Depending on the rotational frequency of the motor 26, the inverter 24 produces subharmonic and interharmonic oscillations which superpose the network frequency of the onboard network 16.

Figure 3:
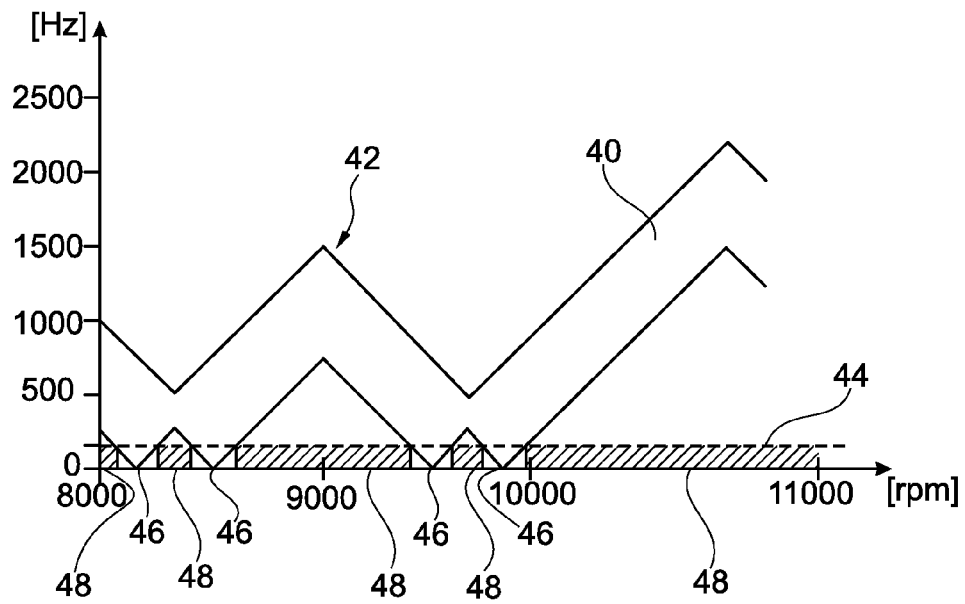
FIG. 3 is a graph having regions of subharmonic and interharmonic oscillations which are to be prevented according to an exemplary embodiment of the present disclosure.

FIG. 3 is a graph which shows, by way of example, the subharmonic and interharmonic oscillations 40 occurring for an electrical consumer 18. On the graph, the rotational frequency of the electric motor 26 is plotted towards the right and the frequency of the oscillations 40 is plotted upwards. The frequency band 42 in which the oscillations 40 exceed a certain level, for example are greater than about 1% or about 3% of the amplitude of the alternating voltage in the onboard network 16, is dependent on the rotational frequency of the motor 26. In the example in FIG. 3, at a rotational frequency of about 9000 rpm, these oscillations 40 are between approximately 750 to about 1500 Hz.

A threshold 44 of approximately 200 Hz is also drawn on the graph in FIG. 3. As is clear from the graph, there are rotational frequency ranges 46 in which oscillations 40 are present below the threshold 44, and rotational frequency ranges 48 in which this is not the case.

If an electrical consumer 18 were to be operated at a rotational frequency from one of the ranges 46, this would lead to subharmonic and interharmonic oscillations 40 in the onboard network 16, which are undesirable. The method for controlling an electrical consumer 18 is configured to prevent these frequency ranges 46.

Figure 4:
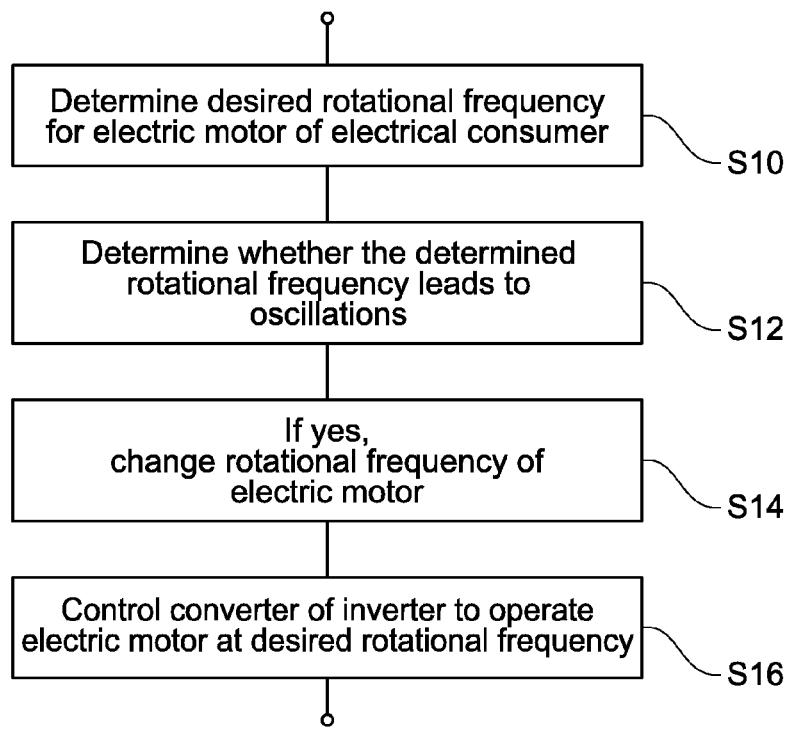
FIG. 4 is a flow diagram for a method for controlling an electrical consumer according to an exemplary embodiment of the present disclosure.

FIG. 4 is a flow diagram which describes a method for controlling an electrical consumer 18.

In S10, a desired rotational frequency for the electric motor 26 of the electrical consumer 18 is determined. For example, the superordinate control unit 20 determines a certain conveying quantity for air which is to be circulated in a cabin of the aircraft 10. Based on this conveying quantity, the control unit 20 may then ascertain, for one or more electrical consumers 18 which comprise a fan, the desired rotational speed for the electric motors 26 of said consumers.

In S12, it is then established whether the determined rotational frequency would lead to subharmonic and interharmonic oscillations 40 in the onboard network 16. This may be determined, for example, from a table in which the ranges 46 and 48 shown in FIG. 3 for the electrical consumer 18 are stored. It is also possible for the subharmonic and interharmonic oscillations 40 which occur at a certain rotational frequency to be calculated from a model of the electrical consumer 18.

S12 may be carried out by the superordinate control unit 20, in which various tables or various models, as might be used in S12, may be stored.

S12 may also be carried out by a local control unit 36 of an electrical consumer 18, in which unit only the associated table or the associated model may then be stored.

In S14, the rotational frequency of the electric motor 26 is then changed if it has been established that undesirable oscillations may occur. In a similar manner to S12, S14 may either be carried out by the superordinate control unit 20 or the local control unit 36.

Various alternatives are possible for S14. For example, information on which rotational frequency for each of the ranges 46 should be selected as a new rotational frequency may be stored in an additional table. It is also possible for a rotational frequency offset to be added to or subtracted from the rotational frequency, which offset is, for example, greater than the width of each of the ranges 46, in such a way that the rotational frequency to be obtained is definitely outside the ranges 46. Furthermore, the upper or lower end of the range 46 may be selected as a new rotational frequency.

For a superordinate control unit 20, it is also possible, in S14, for two different electrical consumers 18 of which the rotational frequencies would fall within a range 46 and which share the same object, for example two electrical consumers 18 which both convey, connected in parallel, air or another fluid, to increase the rotational frequency of one electrical consumer 18 and to decrease the rotational frequency of the other electrical consumer 18. In this way, for example the same fluid quantity may be conveyed although the two electrical consumers convey different fluid quantities.

In S16, the converter 34 is then controlled by the local control unit 36 in such a way that the electric motor 26 is operated at the original rotational frequency, or at the changed rotational frequency if the rotational frequency has been changed. In both cases, the rotational frequency is then in a rotational frequency range 48 in which no, or only slight, subharmonic or interharmonic oscillations are produced in the onboard network 16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for controlling an electrical consumer of an aircraft, comprising:
   determining a rotational frequency for an electric motor;
   determining oscillations in an input current of an inverter based on the determined rotational frequency for the motor, the oscillations produced by the inverter as the inverter produces a supply voltage for the electric motor;
   changing the rotational frequency of the electric motor based on the determined oscillations in the input current of the inverter such that a frequency of the oscillations in the input current of the inverter exceeds a predefined threshold
   determining a rotational frequency range in which the rotational frequency leads to oscillations in the input current of the inverter, whereby the frequency of the oscillations is below the threshold, if it has been established that the rotational frequency leads to oscillations in the input current of the inverter, whereby the frequency of the oscillations is below the predefined threshold; and
   changing the rotational frequency to an end of the rotational frequency range.

2. The method according to claim 1, further comprising:
   determining a rotational frequency at which no oscillations occur in the input current of the inverter, whereby the frequency of the oscillations is below the threshold, if it has been established that the rotational frequency leads to oscillations in the input current of the inverter, whereby the frequency of the oscillations is below the predefined threshold; and
   changing the rotational frequency to the determined rotational frequency.

3. The method according to claim 1, wherein determining oscillations in the input current of the inverter further comprises:
   determining the frequency of the oscillations in the input current of the inverter via a predefined functional correlation with the rotational frequency.

4. The method according to claim 1, wherein the inverter is connectable to an onboard network of the aircraft, which network has a frequency which is variable over time.

5. The method according to claim 1, wherein the predefined threshold is below a network frequency of an onboard network.

6. The method according to claim 1, wherein determining oscillations in the input current of the inverter is carried out by a local control unit which is configured to control the inverter for producing the supply voltage for the electric motor.

7. The method according to claim 1, wherein determining oscillations in the input current of the inverter is carried out by a superordinate control unit which is configured to control a plurality of electrical consumers.

8. The method according to claim 1, wherein the electrical consumer comprises a conveying device, and the method further comprises:
   determining a desired rotational frequency of the electric motor from a desired conveying quantity of the conveying device.

9. The method according to claim 1, wherein the electrical consumer comprises a ventilation device.

10. A method for controlling an electrical consumer of an aircraft, comprising:
   determining a rotational frequency for an electric motor;
   determining oscillations in an input current of an inverter based on the determined rotational frequency for the motor, the oscillations produced by the inverter as the inverter produces a supply voltage for the electric motor;
   wherein rotational frequencies which lead to oscillations in the input current of the inverter having certain frequencies are stored in a table, and determining oscillations in the input current of the inverter further comprises:
   determining the frequency of the oscillations in the input current of the inverter based on the table.

* * * * *